(12) United States Patent
Jobbins

(10) Patent No.: US 6,171,388 B1
(45) Date of Patent: Jan. 9, 2001

(54) LIGHTWEIGHT GYPSUM COMPOSITION

(75) Inventor: Richard M. Jobbins, Freehold, NJ (US)

(73) Assignee: Rhodia Inc., Cranbury, NJ (US)

( * ) Notice: Under 35 U.S.C. 154(b), the term of this patent shall be extended for 0 days.

(21) Appl. No.: 09/266,432

(22) Filed: Mar. 11, 1999

Related U.S. Application Data

(60) Provisional application No. 60/078,353, filed on Mar. 17, 1998.

(51) Int. Cl.[7] .............................. C04B 28/14; C04B 11/00
(52) U.S. Cl. ...................... 106/778; 106/677; 106/678; 106/680; 106/781; 156/39
(58) Field of Search ................................. 106/778, 781, 106/677, 678, 680; 156/39

(56) References Cited

U.S. PATENT DOCUMENTS

| | | | |
|---|---|---|---|
| 4,137,198 | 1/1979 | Sachs | 521/154 |
| 4,265,964 | 5/1981 | Burkhart | 428/306 |
| 4,518,652 | 5/1985 | Willoughby | 428/312.4 |
| 5,109,030 | 4/1992 | Chao et al. | 521/83 |
| 5,258,428 | 11/1993 | Gopalkrishnan | 524/5 |
| 5,401,798 | 3/1995 | Rasp et al. | 524/423 |

FOREIGN PATENT DOCUMENTS

| | | | |
|---|---|---|---|
| 2 287 978 | 5/1976 | (FR) | B28C/5/00 |
| 2 306 950 | 11/1976 | (FR) | C04B/11/14 |
| 47-020217 | 9/1972 | (JP) . | |
| 50-041943 | 4/1975 | (JP) . | |
| 54-037129 | 3/1979 | (JP) . | |
| 57-038360 | 3/1982 | (JP) . | |
| 60-021875 | 2/1985 | (JP) . | |
| 63-307175 | 12/1988 | (JP) . | |
| 1124004 | 11/1984 | (RU) | C04B/43/02 |

OTHER PUBLICATIONS

ASTM Designation: C36–95b, Standard Specification for Gypsum Wallboard (no date).*

ASTM Designation: C473–95, Standard Test Methods for Physical Testing of Gypsum Board Products and Gypsum Lath (no date).*

* cited by examiner

*Primary Examiner*—Anthony Green
(74) *Attorney, Agent, or Firm*—Andrew M. Solomon

(57) ABSTRACT

A composition of matter comprising
(a) gypsum ($CaSO_4 \cdot 2H_2O$);
(b) one or more naturally occurring or synthetic latex polymers; and
(c) one or more nonionic surfactants; wherein said composition of matter has a density less than 0.64 g/cm$^3$ and wherein wallboard produced from said composition of matter satisfies the criteria of ASTM Methods C-36 and C-473 is provided.

20 Claims, No Drawings ies, JP85018536 B4(CA 103:88836), JP 60021875

LIGHTWEIGHT GYPSUM COMPOSITION

This application claims the benefit of U.S. Provisional Patent Application Ser. No. 60/078,353, filed on Mar. 17, 1998.

BACKGROUND OF THE INVENTION

1. Field of the Invention

This invention relates to novel gypsum compositions, a process for preparing these materials and articles containing the materials. More specifically, the materials include as an additive a latex polymer and a surfactant. This combination surprisingly provides strength to the gypsum composition so that lighter weight materials, particularly wallboard can be produced having less weight.

2. Technology Description

Gypsum board is used to make residential and commercial building interior walls. It has advantages over plaster walls because it is relatively easy to install, has lower costs, and requires minimal finishing. Gypsum board is normally supplied in sheets varying from 0.25 to 1 inch in thickness, 48 inches wide and in lengths between 8 and 16 ft. Fifty-four inch wide boards are made for buildings with 9-foot ceilings. The majority of gypsum board made is 4'×8'½" thick.

Gypsum board is relatively dense. When shipped, trucks are limited by weight rather than volume. Since a significant portion of the cost of gypsum board is freight, it is desirable to reduce the weight of gypsum board without sacrificing strength. In addition, lighter boards are easier to handle and install.

Lighter weight structural units can be made in larger sizes, if desired, which can also reduce manufacturing costs per unit of area.

In order to be of any commercial value, the gypsum boards must be able to pass the objective testing criteria of ASTM Methods C-36 and C-473.

Commercial gypsum board contains about 70% air by volume. About 30% of the volume is due to the incorporation of air bubbles. As the volume of air bubbles increases, the strength of the board dramatically decreases. Experience has taught that entrainment of air alone will not product a sufficiently improved lightweight wallboard that has adequate strength. Further, the incorporation of lightweight particles, alone, even at a low levels, does not produce a satisfactory lightweight product.

Problems that have been encountered, lie in the area of dispersing the lightweight articles thoroughly throughout the wet cement or calcined gypsum mixture, and firmly adhering such particles in the cured cementitious matrix. Originally, technologies for decreasing the weight of structural units involved the use of expanded vermiculite, perlite and the like. In a more recent patent, lightweight particles or beads of expandable thermoplastic polymeric resins have been used. They have been primarily expandable polystyrene beads, as well as polyethylene and various polymeric copolymers, which are generally expanded before use to achieve the lowest density. These thermoplastic particles or beads are advantageous in that each particle or bead comprises closed cells and when they are pre-expanded may be readily made to as low a density as 1 pound per cubic foot or even as low as about 0.5 or 0.6 pounds/cubic foot. Generally, preexpansion on a commercial basis will provide particles from as low as about 0.6 pounds per cubic foot to about 1½ pounds per cubic foot without extra and costly equipment and additional processing. Thus, the thermoplastic lightweight particles are a great deal more advantageous than those previously used of vermiculite and/or perlite which have a density at least several times that of the thermoplastic granules.

Despite the improvements associated with the incorporation of particles, brittleness of the cementitious material may result. In a lightweight wallboard, the volume occupied by the thermoplastic and/or entrained air materially reduces the amount of gypsum matrix present and lowers strength and especially the desired flexural strength.

Another major problem that has been encountered in the high speed commercial production of lightweight structural units has been the removal of excess water from the slurry or mixture during the curing. A certain amount of water is required to hydrate the dry cementitious material such as calcined gypsum or cement. To obtain a free flowing mixture, it has been necessary to add excess water on the order of two or three or more times that actually needed for hydration to provide a smooth, free-flowing, low viscosity mixture suitable for use in transporting and placing the mix into a mold or other means where the slurry or mix is dried to form the core for the lightweight structure. The energy, time, equipment and space required for the removal of the excess moisture create a critical obstacle in the low cost manufacture of lightweight, high speed, high volume production of structural units, such as gypsum wallboard and the like.

U.S. Pat. No. 4,265,964 provides a method for producing lightweight gypsum in which low density expandable thermoplastic granules or particles that have been expanded are used in conjunction with a cementitious base material, such as, gypsum (generally calcined to hemihydrate form, i.e. $CaSO_4 \cdot \frac{1}{2}H_2O$); a surfactant; an additive which acts as a frothing agent to incorporate an appropriate amount of air into the mixture to aid in obtaining a light density; a film forming component to provide better flow and consistency of the mixture, as well as greater strength, flexibility, water resistance and adherence of the final product when the mixture is cured; and a starch which may be added as a binding agent and to increase the adhesive properties of the mixture. This patent requires the presence of the particulate material, which increases the overall cost of the final product.

It has been suggested in the literature that improvements in the final gypsum product can be obtained if one to 50 percent by weight of the final product of latex is added. See, for example, U.S. Pat. No. 5,401,798, JP63307175 A2(CA 111:44452), JP85018536 B4(CA 103:88836), JP 60021875 A2(CA 103:10530), JP 57038360 A2 (CA 97:43238), U.S. Pat. No. 4,137,198, JP 50041943 (CA 84:78875). This proposed solution is deficient in that it is imperative that the latex be dispersed throughout the gypsum product, or else potential areas of weakness can occur in the board. While the use of dispersants or surfactants could be utilized to assist in the dispersion of the latex, one skilled in the art would inevitably be led to the conclusion that minimal amounts of dispersants or surfactants be added in order to preserve board strength. Furthermore, the addition of many types of surfactants would lead one skilled in the art to conclude that the viscosity of the slurry used to form the final product would increase to a level which is undesirable for commercial manufacture.

Despite the above teachings, there still exists a need in the art for a gypsum product which, when produced into wallboard, satisfies the criteria of ASTM Methods C-36 and C-473, needs no added particulate material, and, despite having a decrease in weight per unit volume, maintains or demonstrates an increase in strength as compared to the higher density products. The present invention is directed to meeting such objectives.

BRIEF SUMMARY OF THE INVENTION

In accordance with the present invention, a novel gypsum product which satisfies the criteria of ASTM Methods C-36 and C-473, needs no added particulate material, and, despite having a decrease in weight per unit area, maintains or demonstrates an increase in strength is provided. The key to the success of the invention is the addition of a latex to the gypsum product in combination with an excessive amount of nonionic surfactant.

One embodiment of the present invention comprises a composition of matter comprising
(a) gypsum ($CaSO_4 \cdot 2H_2O$);
(b) one or more naturally occurring or synthetic latex polymers; and
(c) one or more nonionic surfactants;
wherein said composition of matter has a density of less than about 0.64 g/cm³ and wherein wallboard manufactured from said composition of matter satisfies the criteria of ASTM Methods C-36 and C-473.

In particularly preferred embodiments, the latex polymer is derived from styrene and acrylic monomers and the nonionic surfactant comprises an alcohol ethoxylate present in an amount of at least 5 percent by weight of the additive polymer.

A further embodiment of the present invention comprises a method for producing lightweight gypsum building materials. This method comprises the steps of:
(a) providing an amount of stucco ($CaSO_4 \cdot \frac{1}{2}H_2O$);
(b) adding water in the amount of 30 to about 90 parts per 100 parts of stucco;
(c) adding as a binder a naturally occurring or synthetic latex polymer to said stucco and water in the amount of about 0.25 to about 10 parts polymer per 100 parts of stucco;
(d) adding a nonionic surfactant in the amount of about 2 to about 30 parts per 100 parts of naturally occurring or synthetic latex polymer to disperse said naturally occurring or synthetic latex;
(e) adding a foaming agent to said components (a), (b), (c) and (d); and
(f) mixing said components to enable said gypsum building material to form and set.

In preferred embodiments, optionally added as processing aids include any of the following materials: fillers, aggregates, fibers, pigments, thickeners, accelerators, retarders and water reducers. In most preferred embodiments, the process includes the additional step of distributing the mixture between two sheets of facing paper prior to setting to form a lightweight wallboard panel.

An object of the present invention is to provide a novel lightweight construction material.

Still another object of the present invention is to provide a method for producing a novel lightweight construction material.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

When the term "parts" is used to define quantitative amounts, the term is intended to define parts by weight unless indicated to the contrary.

The present invention relates to a composition for producing a lightweight gypsum board having excellent strength properties as a result of the addition of a naturally occurring or synthetic latex polymer and a nonionic surfactant in an amount of about 2 to about 30 parts per 100 parts of polymer.

The gypsum board is characterized by having a density of less than about 1650 lbs/1000 square foot for a ½-inch thick board (corresponding to 0.64 gm/cm³), preferably between about 1000 to about 1650 lbs/1000 square foot for a ½-inch thick board (corresponding to between 0.39 and 0.64 gm/cm³), more preferably between about 1000 to about 1300 lbs/1000 square feet for a ½-inch thick board (corresponding to between 0.39 and 0.51 gm/cm³). The board also satisfies the criteria of ASTM Methods C-36 and C-473.

Most gypsum board is made from natural gypsum (calcium sulfate dihydrate), a mineral which is widely distributed throughout the world. The balance is made from synthetic gypsum sources, such as, waste material from flue gas desulfurization operations. Briefly, the board making process consists of the following steps:

Gypsum rock is mined and transported to the board mill, where it is dried, crushed to ~25 μm particle size and calcined at about 175° C. in a special kiln to yield stucco (sometimes referred to as gypsum in hemihydrate form). This reaction is as follows:

$$CaSO_4 \cdot 2H_2O \rightarrow CaSO_4 \cdot \tfrac{1}{2}H_2O + \tfrac{3}{2}H_2O\uparrow$$

Gypsum Stucco

To convert the stucco (gypsum hemihydrate) back into gypsum material suitable for use in construction applications, the stucco is mixed with additives and water and a pregenerated foam in a "pin" mixer to form a slurry. For the production of gypsum board, the slurry is formed into long continuous sheets between two layers of paper. For molded articles, the slurry is placed in a mold. After wetting of the stucco occurs, the hemihydrate dissolves, needle-like gypsum crystals precipitate, the crystal mass sets and becomes solid. The setting reaction is as follows:

$$CaSO_4 \cdot \tfrac{1}{2}H_2O + \tfrac{3}{2}H_2O \rightarrow CaSO_4 \cdot 2H_2O$$

Stucco+Water Gypsum Board

To conclude the process, sheets are cut, flipped over and dried in large continuous ovens. They are then taped face-to-face in pairs and stacked for shipment.

In accordance with the present invention, the primary component of the final composition is gypsum (calcium sulfate dihydrate). However, in order to reduce the density of the final composition while surprisingly maintaining or even increasing its strength a synthetic or naturally occurring latex polymer and a nonionic surfactant are added during manufacture of the building material composition.

The next element of the composition is a naturally occurring or synthetic latex. By the term "latex" it is intended to define a polymeric material in an emulsified form, with water being the preferred dispersion medium. The term "latex polymer" defines the polymeric material of the latex. Also considered within the scope of the present invention are embodiments wherein the dispersion medium comprises an organic solvent.

The naturally occurring or synthetic latex polymers of the present invention are preferably derived from one or more ethylenically unsaturated monomers which are capable of polymerizing in an aqueous environment. Particularly preferred are the use of any of the following monomers: (meth)acrylic based acids and esters, acrylonitrile, styrene, divinylbenzene, vinyl esters including but not limited to vinyl acetate, acrylamide, methacrylamide, vinylidene chloride, butadiene and vinyl chloride. The polymers that are produced may take the form of homopolymers (i.e., only one type of monomer selected) or copolymers (i.e., mixtures of two or more types of monomer are selected; this specifically includes terpolymers and polymers derived from four or more monomers).

Most preferred monomers are vinyl aromatic monomers, such as styrene, used either alone, or combined with monomers which are acrylic based esters. These acrylic based ester monomers are preferably of the formula

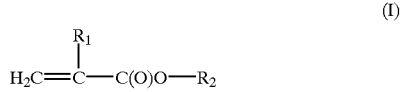

(I)

where $R_1$ is preferably hydrogen or an alkyl group having from 1 to 4 carbon atoms and $R_2$ is an aliphatic group having from 1 to 20 carbon atoms. In most preferred embodiments, $R_1$ comprises hydrogen or a methyl group and $R_2$ is an alkyl group having from 1 to 20 carbon atoms. The substituent $R_2$ may further be substituted with additional organic groups such as hydroxyl (OH), fluoro or silyl groups.

Specifically useful monomers falling within the scope of the invention include methyl methacrylate, ethyl acrylate, butyl acrylate, 2-hydroxyethyl methacrylate, styrene, butyl methacrylate, 2-ethylhexyl acrylate, and mixtures thereof. Particularly preferred is a mixture of styrene, butyl acrylate and acrylic acid.

Other monomers or starting compounds which may be utilized to produce latexes are well known to the art. Examples are set forth in The Encyclopedia of Chemical Technology, Kirk-Othmer, John Wiley & Sons, Vol. 14, pp. 82–97, (1981). To the extent necessary, this passage is hereby incorporated by reference.

The compositions of this invention are prepared by polymerization of monomers emulsified in water using conventional emulsion polymerization procedures. These procedures can either take place in a continuous, batchwise, stepwise or semicontinuous mode. Surfactants which are used for emulsification of the monomers are anionic and nonionic surfactants and mixtures thereof.

Examples of useful anionic surfactants are organosulfates and sulfonates, e.g., sodium and potassium alkyl, aryl and alkaryl sulfates and sulfonates, such as sodium 2-ethylhexyl sulfate, potassium 2-ethylhexyl sulfate, sodium nonyl sulfate, sodium dodecylbenzene sulfonate, sodium lauryl sulfate, potassium methylbenzene sulfonate, potassium toluene sulfonate and sodium xylene sulfonate; higher fatty alcohols, e.g., stearyl, lauryl, etc., which have been ethoxylated and sulfonated; dialkyl esters of alkali metal sulfosuccinic acid salts, such as sodium diamyl sulfosuccinate, and sodium dioctyl sulfosuccinate; formaldehyde-naphthalene sulfonic acid condensation products; and alkali metal salts, partial alkali metal salts and free acids of complex organic phosphate esters.

Examples of nonionic surfactants which can be used in this invention are polyethers, e.g., ethylene oxide and propylene oxide condensates which include straight and branched chain alkyl and alkaryl polyethylene glycol and polypropylene glycol ethers and thioethers; alkylphenoxypoly(ethyleneoxy) ethanols having alkyl groups containing from about 7 to about 18 carbon atoms and having from about 4 to about 240 ethyleneoxy units, such as heptylphenoxy-poly(ethyleneoxy)ethanols, octyl- and nonylphenoxy-poly(ethyleneoxy)ethanols; the polyoxyalkylene derivatives of hexitol (including sorbitans, sorbides, mannitans and mannides); partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol; sulfur containing condensates, e.g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long chain carboxylic acids, such as lauric, myristic, palmitic, or oleic acids or mixtures of acids, such as tall oil fatty acids; and ethylene oxide derivatives of long chain alcohols such as octyl, decyl, lauryl, or cetyl alcohols.

The amounts of surfactants employed in the emulsion polymerization process will range from about 0.01 to about 10 weight percent, preferably between about 0.2 and about 5 weight percent based on the total weight of monomers.

In addition to the surfactants, the emulsion polymerization system can also contain protective colloids. Examples of protective colloids are ether linkage-containing protective colloids, such as hydroxymethyl cellulose, hydroxyethyl cellulose, ethylhydroxyethyl cellulose, carboxymethyl cellulose, ethoxylated starch derivatives and the like. Other protective colloid substances can also be used either alone or together with the ether linkage containing materials. Other such protective colloids include partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starches, glue, gelatin, water soluble alginates, such as sodium or potassium alginate, casein, agar and natural and synthetic gums, such as guar, xanthan, gum arabic and gum tragacanth. The protective colloids can be used in amounts ranging from about 0.1 weight percent to about 2 weight percent based on the total weight of the latex. Other surface active agents are clearly contemplated within the scope of the present invention.

The monomers used in this invention are preferably polymerized by means of a conventional free radical polymerization initiator or initiator system (which can also be referred to as an addition polymerization catalyst, a vinyl polymerization catalyst, or a polymerization initiator), preferably, although not necessarily, one which is substantially water soluble. Amongst such initiators are peroxides, such as hydrogen peroxide, tertiary butyl hydroperoxide, cumene hydroperoxide, alkali metal, (e.g., sodium, potassium or lithium) and ammonium persulfates, perphosphates, and perborates; azo nitriles, such as alpha, alpha-azobisisobutyronitrile, and redox systems including such combinations as mixtures of hydrogen peroxide, t-butyl hydroperoxide or the like and any of the iron salts, titanous salts, zinc formaldehyde sulfoxylate, or sodium formaldehyde sulfoxylate; alkali metal or ammonium persulfate, perborate or perchlorate together with an alkali metal bisulfite, such as sodium metabisulfite; and alkali metal persulfate together with an aryl phosphinic acid such as benzene phosphinic acid and the like. The amount of polymerization initiator employed will be no more than that required to obtain substantially complete monomer conversion at lower initiator cost. The amount of initiator will generally vary from about 0.1 to about 1 percent by weight based on the weight of the monomers added.

The emulsification and polymerization reaction can be conducted by any of the well known procedures which are used to prepare emulsion polymers. For instance, the monomers, initiators, surfactants, protective colloids, if used, and chain transfer agents, e.g., alkyl mercaptans, if used, can all be added to the reactor, with suitable agitation to obtain emulsification at a temperature of about 30° C. to about 95° C. until the polymerization is complete.

Alternatively, the reaction can be conducted by adding water, surfactants, and protective colloids, if used, into the reactor, raising the temperature to the reaction temperature and then adding the monomers and a solution of the initiator to the reactor under agitation. Still another method is to pre-emulsify the monomers in a portion of the water and a portion of the surfactant along with initiator, and to add the pre-emulsion to the reactor which contains the remaining water and surfactant.

The latex synthesis technique, which is considered as falling within the skill of the artisan can be utilized to yield latexes having a mean number particle size ranging from about 10 to about 500 nanometers, more preferably between about 50 and about 300 nanometers and most preferably between about 80 and about 250 nanometers.

In addition, the minimum film forming temperature (MFFT) of the polymer of the resulting latex can be produced to yield an ideal value by selection of the types of monomers and respective amounts used to form the polymer. In a preferred embodiment, the MFFT ranges between about 0 and about 85° C.

In the preferred embodiment, the amount of latex added is between about 0.25 to about 10 parts by weight of latex polymer per 100 parts by weight of gypsum hemihydrate.

Also added to the gypsum hemihydrate to yield the final composition is one or more nonionic surfactants. These surfactants are added in addition to those used to form the latex polymer and are used to disperse the latex polymer throughout the gypsum slurry. Nonionic surfactants suitable for use are higher (greater than $C_8$) aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher (greater than $C_8$) alcohol polyethylene polypropylene block or random adducts and mixtures thereof. Of the above classes of nonionic surfactants, the alcohol ethoxylates and alkaryl ethoxylates are particularly preferred.

The amount of nonionic surfactant to be added is considered to be critical to the success of the invention. One skilled in the art would intuitively think that a primary goal would be to minimize the amount of surfactant added. The inventor has surprisingly discovered that if an excess of nonionic surfactant is added in combination with the latex polymer the following advantages are achieved: (1) the latex is better distributed throughout the slurry; (2) the resulting material has improved strength per unit weight ; and (3) the slurry viscosity is decreased. In practice, the amount of nonionic surfactant to be added should be at least 50% more than what formerly would have been used for polymerization. Quantitatively, this amounts to between about 0.05 to about 0.3 parts per part of latex polymer.

The other critical material used to form the final product is water. Water is added to the process to hydrate the stucco, provide needed fluidity and to make the foam. The lower the amount of water present, the lower the drying costs. It is added to form the final product in amounts of between about 30 to about 90 parts per 100 parts of stucco.

Also considered as falling within the scope of the present invention is the presence of the following additives which are commonly used in the manufacture of gypsum based building materials: water reducers, retarders, accelerators, foaming agents, defoamers, paper fibers, particulate fillers and aggregates, starch and facing papers (if wallboard is the desired end product). The amounts of these optional additives to be added are considered as being within the skill of the artisan. In practice, between about 0 to about 500 parts of each of these additives are added per 100 parts of gypsum (hemihydrate). In practice, the additives other than the fillers and facing papers are typically used in amounts of less than 1 part by weight per 100 parts by weight of gypsum.

The term "foaming agent" as used herein means a substance that can introduce fine gas bubbles into the compositions of this invention and which is not the nonionic surfactant which is added for the purpose of distributing the latex throughout the gypsum slurry. Typical foaming agents are anionic, nonionic or cationic surfactants. The foaming agent can also be of the reactive type such as aluminum powder which generates hydrogen bubbles when mixed with wet cement. The foaming agent is preferably used at a level of 0 to about 10 parts by weight based on 100 parts by weight of gypsum hemihydrate. Particularly preferred is the use of anionic surfactants, more specifically alkyl ether sulfates, in water.

Suitable fillers for this invention include substances such as sand, clay, fly ash, shale and the like. Suitable aggregates include substances like gravel, crushed rocks and the like. The fillers and aggregates can make up from 0 to about 500 parts by weight of the compositions of this invention based on 100 parts by weight of gypsum hemihydrate.

The foamed compositions of this invention can also optionally contain plastic or metallic scrims and fibers, such as, for example, glass fibers, ceramic fibers, glass/ceramic fibers, metallic wires, mineral fibers, and natural and synthetic fibers such as cotton, wool, nylon, rayon, polyesters and the like.

The foamed compositions of this invention can optionally contain pigments such as titanium dioxide, carbon black, iron oxide and the like.

The accelerators enhance the setting reaction. Suitable accelerators include, for example, potassium sulfate, finely ground gypsum, $CaCl_2$, $Na_2CO_3$, NaOH, CaO, $Ca(OH)_2$, and the like. Usually both potassium sulfate and specially prepared ground gypsum are used. They have complementary effects. The ground gypsum provides many nucleation sites for crystal growth which tends to produce many fine crystals. The potassium sulfate increases the solubility of the calcium sulfate and alters crystal aspect ratio yielding larger, fatter crystals.

Retarders are used to just slightly delay the setting reactions until after the stucco/water slurry has been formed into a sheet. This eliminates plugging of the mixing equipment with gypsum crystals. Suitable retarders include, for example, sodium citrate, sodium phosphate, proteins, and the like.

The foamed compositions of the present invention can optionally contain from 0 to about 5 parts by weight of water reducers based on 100 parts by weight of hydraulic substances. As used herein, the term "water reducer" means a substance which is generally used in gypsum to improve the flow properties so that the compositions can be pumped or effectively poured. The water reducers, also commonly referred to as superplasticizers, can be used to make hydraulic compositions with a reduced water content which still retain adequate flow properties. Examples of suitable water reducers for use in this invention include, for example, lignosulfonates, sodium naphthalene sulfonate formaldehyde condensates and the like.

Defoamers may be added to board edges to create denser strong regions for nailing.

When the end product to be manufactured is wallboard, facing papers are used to cover the two exterior faces of the slurry. In practice, specially selected paper is used to confer the appropriate appearance and strength to the wallboard. A starch binder for adhering the facing paper to the gypsum slurry is typically also present for this embodiment.

To produce the end product, the following procedure is utilized. Stucco (gypsum hemihydrate) slurries are prepared in a special mixer immediately prior to forming into sheets. The mixer consists of a short cylindrical shell several feet in diameter containing a flat rotor which spins with a peripheral speed of 30 to 150 ft/sec. The rotor and top of the mixer housing have lines of meshing pins. The outer periphery of the rotor is saw toothed and the discharge port is below these teeth.

Stucco is fed into the top of the pin mixer along with the other dry components. Water containing the potassium sulfate, water reducers, and retarders is added through another port and foam prepared using high shear mixing is fed to another. The latex polymer, along with excess nonionic surfactant may be added with the foam, with the aqueous components or separately. The residence time in the mixer is very short, probably less than 1 second.

For the manufacture of wallboard, the slurry is discharged to a chute which spreads it on a moving paper sheet which is slightly wider than the desired board. A top sheet of paper is then placed on the slurry and rollers and guides form it to the desired thickness and width. The green board then travels undisturbed on rollers for several minutes. The setting reaction occurs and the boards become firm. Boards are then cut to length, flipped, and fed to a large continuous oven for drying.

For molded articles, the gypsum slurry is distributed to a mold and the slurry sets to form the article. Also intended to be encompassed by the present invention is the use of the inventive composition of matter in the production of acoustic building materials (sound reflecting panels, soundproofing materials, noise dampening materials, and the like).

By adjusting the proportion of foam in the slurry, the resulting material can have a much lower density than commercially available gypsum products. A reduction in density as compared to the commercially available gypsum products of at least 10%, more preferably at least 15% and most preferably at least 20%. This corresponds to board core densities of approximately 0.58, 0.54 and 0.51 g/cm$^3$, respectively. Commercial gypsum board has a density of about 0.64 g/cm$^3$. This reduction in density allows for increased savings associated with the shipment of these materials as well as making them easier to handle and install. In addition, despite the loss in density, the resulting materials do not have a corresponding loss in strength. Moreover, the strength of gypsum articles can be increased by up to 35% percent as compared to materials of the same density not containing the latex/excess nonionic surfactant combination. This result is truly unexpected, particularly since an excessive amount of surfactant is used to distribute the latex throughout the gypsum slurry.

The resulting building materials (i.e., gypsum wallboard) must meet the criteria which are set forth in ASTM Methods C-36 and C-473. These are the tests as defined by the American Society for Testing and Materials, West Conshohocken, PA. To the extent necessary for completion, these standardized test methods are expressly incorporated by reference. The C-36 test is the Standard Specification for Gypsum Wallboard while the C-473 test is the Standard Test Methods for Physical Testing of Gypsum Board Products and Gypsum Lath. Requirements for composition, flexural strength, humidified deflection, hardness, nail pull resistance, dimensions, and appearance are specified in these test procedures. The most critical requirement for gypsum board is the nail pull resistance. For a 1/2-inch board, an 80-Lb nail pull is specified. The inventive materials, when formed into wallboard, satisfy the criteria of ASTM C-36 and C-473.

The invention is described in greater detail by the following non-limiting examples.

COMPARATIVE EXAMPLE 1

0.12 parts of finely ground gypsum are added to 150.0 parts of stucco. 0.045 parts of potassium sulfate, and 0.34 parts of lignin sulfonate are dissolved in 96.4 parts of water. In a separate vessel, 1.5 parts of an 5% ammonium linear alcohol ether sulfate surfactant (Rhodapex CD-128) solution in 33.5 parts of water are mixed for one minute to create a foam. The stucco, water phase and foam are rapidly combined to form a slurry. The entire slurry is mixed using a mixer operating at a mixing speed of from 1200 to 4000 revolutions per minute for 30 seconds and poured into a cube mold to set. The time from addition of the water to the stucco to the completion of the cubes takes less than about 60 seconds. Cubes are then dried overnight at 45° C. and placed in a room temperature chamber at 50% relative humidity. Cubes are thereby created having a nominal density of 0.64 g/cm$^3$.

COMPARATIVE EXAMPLE 2

A latex composition is produced by conventional emulsion polymerization procedures. The latex is made from the following monomers: 57 parts by weight styrene, 41 parts by weight butyl acrylate and 2 parts by weight acrylic acid. Polymerization occurs in an aqueous environment, in the presence of 5 parts by weight of Igepal CA-897, an octylphenol ethoxylate nonionic surfactant sold by Rhodia Inc. having 40 moles of ethylene oxide, an HLB value of 18.0 and a cloud point of >100° C. and in the presence of 0.25 parts by weight of sodium dodecylbenzene sulfonate. The latex has a minimum film forming temperature of about 30° C. and a mean particle size of about 119 nm. To 1.0 part of stucco 0.0246 parts by weight of the latex (0.01 part by weight of the polymer) are added prior to mixing and setting in 1-inch cube molds. The resulting four cubes have an average density of 0.645 g/cm$^3$.

EXAMPLE 3

The procedure of Comparative Example 2 is repeated except that additional Igepal CA-897 amounting to 0.05 parts of surfactant per part of polymer is added to the latex prior to incorporation into the stucco slurry. The resulting cubes have an average density of 0.656 g/cm$^3$.

EXAMPLE 4

The procedure of Comparative Example 2 is repeated except that an additional amount of 0.10 parts of surfactant per part of polymer is added to the slurry. The resulting cubes have an average density of 0.626 g/cm³.

Additional samples are produced where the amount of polymer added is equal to 0.02, and 0.04 parts by weight per part of the stucco

EXAMPLE 5

The procedure of Comparative Example 2 is repeated except that an additional amount of 0.15 parts of surfactant per part of polymer is added to the slurry. The resulting cubes have an average density of 0.613 g/cm³.

EXAMPLE 6

The procedure of Comparative Example 2 is repeated except that an additional amount of 0.20 parts of surfactant per part of polymer is added to the slurry. The resulting cubes have an average density of 0.611 g/cm³.

EXAMPLE 7

The procedure of Comparative Example 2 is repeated except that an additional amount of 0.25 parts of surfactant per part of polymer is added to the slurry. The resulting cubes have an average density of 0.605 g/cm³.

EXAMPLE 8

The procedure of Comparative Example 2 is repeated except that an additional amount of 0.30 parts of surfactant per part of polymer is added to the slurry. The resulting cubes have an average density of 0.594 g/cm³.

EXAMPLE 9

The procedure of Example 4 is repeated except that the latex has a mean particle size of about 216 nm. The resulting cubes have an average density of 0.605 g/cm³.

Additional samples are produced where the amount of polymer added is equal to 2.0, and 4.0 parts by weight per 100 parts by weight of the stucco.

EXAMPLE 10

The procedure of Example 4 is repeated except that the latex has a mean particle size of about 66 nm. The resulting cubes have an average density of 0.583 g/cm³.

Additional samples are produced where the amount of polymer added is equal to 2.0, and 4.0 parts by weight per 100 parts by weight of the stucco.

Testing Data

The compressive strength of the gypsum cubes is measured using an Instron machine and the ASTM D-696 Plastics Compression Procedure. The compression rate is reduced to 0.03 in/min because the gypsum cubes fail at compressive strains of less than 0.01 inch. In the procedure, 1" cubes are placed between anvil faces and compression is initiated. The compressive force is monitored continuously and the test is run until the cubes fail. The maximum compressive force is recorded for and used as a measure of cube strength. The compressive strength is reported in pounds per square inch. The compressive strength of gypsum varies significantly with density. Analogous to the strength of foamed plastics, it is found that for a given formulation, the strength of gypsum cubes is proportional to a power of the density. In this case, the following formula applies.

$$\text{Strength} = A \times (\text{density})^3$$

This formula is used to adjust the strength values to a common basis density.

Strength values for the cubes of Comparative Example 2 and Examples 3-8 are shown in the following table. The compressive strengths are adjusted to a density of 0.64 g/cm³.

| Sample | Strength (psi) |
|---|---|
| Comparative Example 2 | 365 |
| Example 3 | 482 |
| Example 4 | 520 |
| Example 5 | 485 |
| Example 6 | 445 |
| Example 7 | 439 |
| Example 8 | 456 |

As can be seen from the data, the strength of the cube increases by the addition of an excess amount of nonionic surfactant. The maximum strength increase occurs at an added surfactant level of 10–15 percent by weight of the polymer in the latex.

Additional strength testing is done based upon the variables of particle size of the latex and the amount of polymer added to the gypsum slurry. The results are shown in the following table.

| Sample | Parts Polymer | Strength |
|---|---|---|
| Example 4 | 0.01 | 470 |
| Example 4 | 0.02 | 490 |
| Example 4 | 0.04 | 495 |
| Example 9 | 0.01 | 420 |
| Example 9 | 0.02 | 490 |
| Example 9 | 0.04 | 470 |
| Example 10 | 0.01 | 407 |
| Example 10 | 0.02 | 457 |
| Example 10 | 0.04 | 406 |
| Comparative Example 1 | 0.0 | 379 |

The inventive compositions (Examples 3–10) are used to produce standard gypsum wallboard (½ inches thick) using the methods described herein (i.e., applying the slurry to one facing paper, covering the slurry with another sheet of facing paper, setting the slurry, cutting the board to appropriate size and drying it). All of the wallboards made from the inventive compositions (Examples 3–10) successfully meet the criteria of ASTM C-36 and C-473.

Having described the invention in detail and by reference to the preferred embodiments thereof, it will be apparent that modifications and variations are possible without departing from the scope of the appended claims.

What is claimed is:

1. A composition of matter comprising
   (a) gypsum ($CaSO_4 \cdot 2H_2O$)
   (b) one or more naturally occurring or synthetic latex polymers present in an amount of between about 0.25 to about 10 parts by weight per 100 parts by weight of gypsum hemihydrate necessary to Drovide the gypsum; and
   (c) one or more nonionic surfactants present in an amount of between about 0.05 and about 0.3 part by weight per part by weight of latex polymer;
   wherein wallboard produced from said composition of matter and water satisfies the criteria of ASTM Methods C-36 and C-473 and has a molded density of less than about 0.64 g/cm³.

2. The composition according to claim 1 having a molded density of between about 0.39 and about 0.64 g/cm³.

3. The composition according to claim 1 having a molded density of between about 0.39 and about 0.51 g/cm³.

4. The composition according to claim 1 wherein said latex polymer is a polymer derived from ethylenically unsaturated monomers selected from the group consisting of (meth)acrylic based acids and esters, acrylonitrile, styrene, divinylbenzene, vinyl esters, acrylamide, methacrylamide, vinylidene chloride, butadiene and vinyl chloride and mixtures thereof.

5. The composition according to claim 4 wherein said latex polymer is a homopolymer of styrene monomers or a copolymer derived from styrene monomers and a monomer comprising an acrylic based ester of the formula:

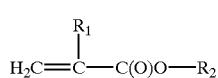

(I)

where $R_1$ is hydrogen or an alkyl group having from 1 to 4 carbon atoms and $R_2$ is an aliphatic group having from 1 to 20 carbon atoms.

6. The composition according to claim 1 wherein said one or more nonionic surfactants is selected from the group consisting of higher aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide and higher alcohol polyethylene polypropylene block or random adducts and mixtures thereof, wherein higher represents a hydrophobic moiety having at least eight carbon atoms.

7. The composition according to claim 6 wherein said one or more nonionic surfactants is selected from the group consisting of alcohol ethoxylates and alkaryl ethoxylates.

8. The composition according to claim 1 wherein the latex polymer has a particle size ranging from about 50 to about 300 nanometers.

9. The composition according to claim 1 wherein the one or more latex polymers has a particle size ranging from about 80 to about 250 nanometers.

10. The composition according to claim 1 including one or more of the following additional materials selected from the group consisting of: water reducers, retarders, accelerators, foaming agents, defoamers, paper fibers, particulate fillers and aggregates, starch, pigments and facing papers, in an amount up to about 500 parts by weight per 100 parts by weight of gypsum.

11. A composition of matter consisting essentially of:
(a) gypsum ($CaSO_4 \cdot 2H_2O$);
(b) a latex polymer wherein said polymer is formed by the polymerization of styrene, butyl acrylate and acrylic acid and is present in an amount of between about 0.25 to about 10 parts by weight per 100 parts by weight of gypsum hemihydrate necessary to provide the gypsum; and
(c) a nonionic surfactant comprising an octylphenol ethoxylate present in an amount of between about 0.05 to about 0.3 parts by weight per part by weight of latex polymer;
wherein wallboard produced form said composition of matter and water satisfies the criteria of ASTM Methods C-36 and C-473 and has a molded density of less than about 0.64g/cm³.

12. A process for producing lightweight gypsum building materials comprising the steps of:
(a) providing an amount of stucco ($CaSO_4 \cdot \frac{1}{2}H_2O$);
(b) adding water in the amount of 30 to about 90 parts per 100 parts of stucco;
(c) adding as a binder a naturally occurring or synthetic latex to said stucco and water in the amount of about 0.25 to about 10 parts latex polymer per 100 parts of stucco;
(d) adding a nonionic surfactant in the amount of about 2 to about 30 parts per 100 parts of naturally occurring or synthetic latex polymer to disperse said naturally occurring or synthetic latex;
(e) adding a foaming agent; and
(f) mixing said components (a), (b), (c), (d) and (e) to enable said gypsum building material to form and set, producing a building material having a molded density of less than about 0.64g/cm³ and satisfying the criteria of [AST] ASTM in Methods C-36 and C-473.

13. The process according to claim 12 comprising the additional step of applying the mixture in step (f) between two sheets of facing paper prior to said gypsum building material setting.

14. The process according to claim 12 wherein said latex polymer is a polymer derived from ethylenically unsaturated monomers selected from the group consisting of (meth) acrylic based acids and esters, acrylonitrile, styrene, divinylbenzene, vinyl esters, acrylamide, methacrylamide, vinylidene chloride, butadiene and vinyl chloride and mixtures thereof.

15. A composition of matter comprising:
(a) gypsum ($CaSO_4 \cdot 2H_2O$);
(b) one or more naturally occurring or synthetic latex polymers in an amount of about 0.25 to about 10 parts of latex polymer per 100 parts of gypsum hemihydrate necessary to provide the gypsum; and
(c) in addition to any surfactant employed in polymerization of the latex polymer, one or more nonionic surfactants in an amount of from about 0.05 to about 0.3 parts per part of latex polymer;
the composition characterized by a density of less than about 0.64 g/cm³ and a compressive strength per unit weight of the composition that is greater than the compressive strength of a similar composition of similar unit weight but not having component (c) present in said similar composition.

16. A composition according to claim 15 wherein the one or more latex polymers is a polymer derived from ethylenically unsaturated monomers selected form the group consisting of (meth)acrylic based acids and esters, acrylonitrile, styrene, divinylbenzene, vinyl esters, acrylamide, methacrylaminde, vinylidene chloride, butadiene and vinyl chloride and mixtures thereof.

17. A composition according to claim 16 wherein the latex polymer is a copolymer derived from styrene, butyl acrylate and acrylic acid.

18. A composition according to claim 15 wherein the one or more nonionic surfactants is selected from the group consisting of higher alcohol ethoxylates and alkaryl ethoxylates wherein higher represents a hydrophobic moiety having at least eight carbon atoms.

19. A composition according to claim 16 wherein the one or more nonionic surfactants is selected from the group consisting of higher alcohol ethoxylates and alkaryl ethoxylates wherein higher represents a hydrophobic moiety having at least eight carbon atoms.

20. A composition according to claim 17 wherein the one or more nonionic surfactants is selected from the group consisting of higher alcohol ethoxylates and alkaryl ethoxylates wherein higher represents a hydrophobic moiety having at least eight carbon atoms.

* * * * *